(12) United States Patent
Amano et al.

(10) Patent No.: US 11,161,427 B2
(45) Date of Patent: Nov. 2, 2021

(54) MANAGEMENT SERVER, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Nariaki Amano, Tokyo-to (JP); Naoki Yamamuro, Nagoya (JP); Masato Endo, Nagakute (JP); Yukiya Yamane, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/416,650

(22) Filed: May 20, 2019

(65) Prior Publication Data
US 2019/0351782 A1 Nov. 21, 2019

(30) Foreign Application Priority Data
May 21, 2018 (JP) .............................. JP2018-097059

(51) Int. Cl.
*B60L 53/66* (2019.01)
*G06Q 50/06* (2012.01)
*B60L 53/68* (2019.01)

(52) U.S. Cl.
CPC ............. *B60L 53/665* (2019.02); *B60L 53/68* (2019.02); *G06Q 50/06* (2013.01)

(58) Field of Classification Search
CPC ...... B60L 53/665; B60L 53/68; B60L 53/305; G06Q 50/06; G06Q 30/0283; Y02T 90/169; Y02T 90/12; Y02T 10/7072; Y02T 10/70; Y02T 90/167; Y02T 90/16; Y04S 30/14; G07F 15/005
See application file for complete search history.

(56) References Cited

U.S. PATENT DOCUMENTS

| | | | |
|---|---|---|---|
| 2010/0079004 A1* | 4/2010 | Keefe | ...................... B60L 53/65 307/80 |
| 2012/0089408 A1* | 4/2012 | Stancil | .................... B60L 53/66 705/1.1 |
| 2019/0152340 A1* | 5/2019 | Haneda | .................. G06Q 50/30 |

FOREIGN PATENT DOCUMENTS

| | | |
|---|---|---|
| CN | 104637171 A | 5/2015 |
| CN | 107239966 A | 10/2017 |
| JP | 2010-079456 A | 4/2010 |
| JP | 2012-095432 A | 5/2012 |

* cited by examiner

*Primary Examiner* — Nha T Nguyen
(74) *Attorney, Agent, or Firm* — Hunton Andrews Kurth LLP

(57) ABSTRACT

In a management server, a first acquirer acquires contract information regarding electricity supply between an electricity supplier and a manager of the installation place of an electric outlet supplied with electricity from the electricity supplier. A second acquirer acquires charge result information of a user's vehicle charged up with electricity supplied through the electric outlet. A deriver derives an amount of payment to the manager based on the contract information acquired at the first acquirer and the charge result information acquired at the second acquirer.

5 Claims, 3 Drawing Sheets

MANAGEMENT SERVER, INFORMATION PROCESSING METHOD, AND INFORMATION PROCESSING SYSTEM

The disclosure of Japanese Patent Application No. 2018-097059 filed on May 21, 2018 including the specification, drawings and abstract is incorporated herein by reference in its entirety.

BACKGROUND

1. Technical Field

The present disclosure relates to a management server, an information processing method, and an information processing system for managing information regarding electricity trade.

2. Description of Related Art

There are known systems that enable drivers of electric vehicles to charge up the batteries of their electric vehicles using electric outlets installed in houses or stores where they are visiting. JP-A-2010-079456 discloses an electricity bill charging system in which a center device notifies an electricity supplier having a contract with the owner of a vehicle, of information on the amount of electricity supplied to the vehicle through an electric outlet at an electricity supply place. In this system, the owner of the vehicle is directly charged a fee corresponding to the amount of electricity supplied to the vehicle, and a manager of the electricity supply place is charged a fee for a difference amount of electricity calculated by subtracting the amount of electricity supplied to the vehicle.

The inventors have found that it may be suitable in some situations for the electricity supplier to charge the fee for electricity supplied to a vehicle through an electric outlet at the electricity supply place, to the manager of the electricity supply place. For example, when the manager has signed up for an electricity plan that is more economical as the electricity usage becomes greater than a predetermined amount, expecting that the electricity usage at the electricity supply place would be greater than the predetermined amount, and when the manager gets points corresponding to the electricity usage, charging the electricity fee to the manager may be suitable. However, if the manager is simply charged the fee for the electricity supplied to a vehicle, the manager will need to charge the fee to the user of the vehicle, which may increase burden on the manager.

SUMMARY

The present embodiment addresses the above-described issue, and a general purpose thereof is to provide a management server, an information processing method, and an information processing system capable of charging a fee for electricity supplied to a vehicle through an electric outlet, to the manager of the place where the electric outlet is installed, without increasing the burden on the manager.

In response to the above issue, a management server of one aspect of the present embodiment includes: a first acquirer configured to acquire contract information regarding electricity supply between an electricity supplier and a manager of the installation place of an electric outlet supplied with electricity from the electricity supplier; a second acquirer configured to acquire charge result information of a user's vehicle charged up with electricity supplied through the electric outlet; and a deriver configured to derive an amount of payment to the manager on the basis of the contract information acquired at the first acquirer and the charge result information acquired at the second acquirer.

According to this aspect, since the amount of payment to the manager is derived based on the contract information between the electricity supplier and the manager and on the charge result information of the vehicle, the fee for the electricity supplied to the vehicle through the electric outlet can be charged to the manager without increasing the burden on the manager.

When a contract unit price included in the contract information is lower than a predetermined unit price, the deriver may derive an amount charged to the user on the basis of the contract unit price and the charge result information.

When the contract unit price is the predetermined unit price or higher, the deriver may derive an amount charged to the user on the basis of the predetermined unit price and the charge result information.

Another aspect of the present embodiment relates to an information processing method. The information processing method includes: acquiring contract information regarding electricity supply between an electricity supplier and a manager of the installation place of an electric outlet supplied with electricity from the electricity supplier; acquiring charge result information of a user's vehicle charged up with electricity supplied through the electric outlet; and deriving an amount of payment to the manager on the basis of the contract information acquired and the charge result information acquired.

According to this aspect, since the amount of payment to the manager is derived based on the contract information between the electricity supplier and the manager and on the charge result information of the vehicle, the fee for the electricity supplied to the vehicle through the electric outlet can be charged to the manager without increasing the burden on the manager.

Yet another aspect of the present embodiment relates to an information processing system. The information processing system includes an electricity supply device, and a management server configured to communicate with the electricity supply device. The electricity supply device includes: an electric outlet supplied with electricity from an electricity supplier; and a control device configured to retain contract information regarding electricity supply between the electricity supplier and a manager of the installation place of the electric outlet and to record charge result information of a user's vehicle charged up with electricity supplied through the electric outlet. The management server includes: a first acquirer configured to acquire the contract information from the control device; a second acquirer configured to acquire the charge result information from the control device; and a deriver configured to derive an amount of payment to the manager on the basis of the contract information acquired at the first acquirer and the charge result information acquired at the second acquirer.

According to this aspect, since the amount of payment to the manager is derived based on the contract information between the electricity supplier and the manager and on the charge result information of the vehicle, the fee for the electricity supplied to the vehicle through the electric outlet can be charged to the manager without increasing the burden on the manager.

BRIEF DESCRIPTION OF THE DRAWINGS

Embodiments will now be described, by way of example only, with reference to the accompanying drawings that are

DETAILED DESCRIPTION

Various embodiments now will be described. The embodiments are illustrative and are not intended to be limiting.

Figure 1:
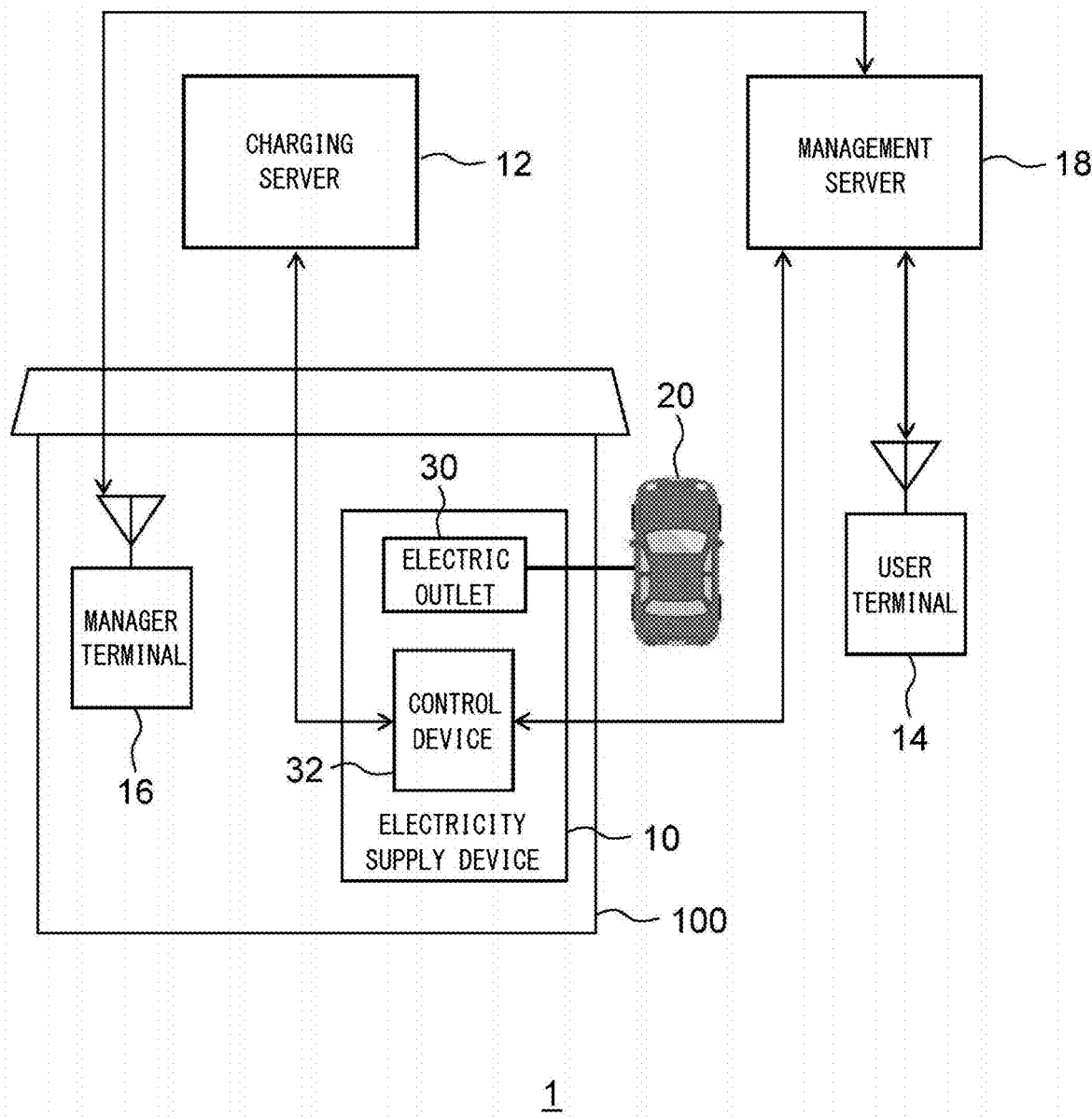
FIG. 1 is a block diagram that shows a configuration of an information processing system according to an embodiment.

FIG. 1 shows a configuration of an information processing system 1 according to an embodiment. The information processing system 1 includes an electricity supply device 10, a fee charging server 12, a user terminal 14, a manager terminal 16, and a management server 18. Although the embodiment describes an example in which one electricity supply device 10, one manager terminal 16, and one user terminal 14 are provided, the information processing system 1 may include multiple electricity supply devices 10, multiple manager terminals 16, and multiple user terminals 14.

The electricity supply device 10 may be installed in a store, a house, a company, a parking area, and other facilities, for example, and is capable of supplying electricity to a vehicle 20 owned by one of multiple users registered in advance in the management server 18. The electricity supply device 10 is also called an authentication outlet. The electricity supply device 10 includes an electric outlet 30 and a control device 32. A facility where the electricity supply device 10 is installed is referred to as an installation place 100 of the electric outlet 30.

To the electric outlet 30, electricity is supplied from an electricity supplier, such as an electricity company. Also, to the electric outlet 30, a vehicle 20 of a user can be electrically connected using a charging cable. The vehicle 20 may be an electric vehicle, a hybrid vehicle, or the like that includes an electric motor for generating vehicle drive power, and a secondary battery for storing electricity used to drive the electric motor. Electricity is supplied to the vehicle 20 through the electric outlet 30, and the secondary battery mounted on the vehicle 20 is charged up therewith. The control device 32 performs wired communication or wireless communication with the management server 18 and the fee charging server 12, and also controls the electricity supply through the electric outlet 30.

The fee charging server 12 may be installed in a data center of an electricity supplier, for example. The fee charging server 12 derives an electricity fee for electricity supplied from an electricity supplier to the installation place 100 of the electric outlet 30. The electricity fee thus derived includes a fee for electricity supplied to the vehicle 20 through the electric outlet 30, and a fee for electricity consumed for electrical equipment other than the electricity supply device 10. The derived electricity fee is charged to the manager of the installation place 100 of the electric outlet 30.

The user terminal 14 is owned by the user of the vehicle 20. The user terminal 14 may be a mobile terminal, such as a smartphone, cellular phone, tablet terminal, notebook computer, and wearable terminal, or may be a vehicle-mounted terminal configured as a car navigation system, for example.

The user terminal 14 performs wireless communication with the management server 18. Based on information received from the management server 18, the user terminal 14 displays information regarding multiple electric outlets 30 near the current position, for example. The information regarding an electric outlet 30 includes a position, a chargeable time period, and the likes. The user terminal 14 can accept a user's entry of a use request for an electric outlet 30. The use request includes information for identifying the electric outlet 30 specified by the user, for example. The user terminal 14 then transmits the use request thus accepted to the management server 18. To the use request, information for identifying the user is attached.

The management server 18 may be installed in a data center, for example, and functions as an information processing device for processing information transmitted from the user terminal 14 and the electricity supply device 10 to perform user authentication processing, payment processing, billing processing, and the like. According to the use request transmitted from the user terminal 14, the management server 18 transmits an unlocking request to the electricity supply device 10 that includes the electric outlet 30 specified by the user. The configuration of the management server 18 will be described later.

Upon reception of the unlocking request from the management server 18, the control device 32 unlocks the electric outlet 30. While the electric outlet 30 is locked, even though the vehicle 20 is connected to the electric outlet 30, the control device 32 inhibits electricity supply through the electric outlet 30.

The control device 32 acquires, from the fee charging server 12, contract information regarding electricity supply between the electricity supplier and the manager of the installation place 100 of the electric outlet 30 and retains the contract information thus acquired. When the control device 32 already retains the contract information, the control device 32 need not necessarily acquire the contract information from the fee charging server 12. The contract information includes a contract unit price, which is a fee per unit electricity. The contract unit price may be set for each time period. The control device 32 transmits the retained contract information to the management server 18. The management server 18 then transmits fee information based on the received contract information to the user terminal 14.

After the transmission of the use request, the user terminal 14 receives the fee information of the specified electric outlet 30 from the management server 18. Accordingly, the user terminal 14 displays the fee information. The user can check the fee information on the user terminal 14 and determine whether to use the specified electric outlet 30. When the user agrees to the fee information, the user connects the vehicle 20 to the electric outlet 30 with a charging cable. When the user cannot agree to the fee information, the user may specify another electric outlet 30.

When the vehicle 20 is connected to the electric outlet 30 while the electric outlet 30 is unlocked, the control device 32 starts electricity supply to the vehicle 20 through the electric outlet 30. When a predetermined period of time elapses after the start of battery charge, when the secondary battery of the vehicle 20 is fully charged, or when the user disconnects the charging cable from the electric outlet 30, for example, the control device 32 terminates the electricity supply to the vehicle 20 through the electric outlet 30.

The control device 32 records charge result information of the vehicle 20 charged up with electricity supplied thereto through the electric outlet 30. The charge result information includes a charging time for which electricity has been supplied to the vehicle 20 through the electric outlet 30. After the completion of the battery charge, the control device 32 transmits the charge result information thus recorded to the management server 18.

Based on the contract information of the electricity supply device 10 used for the battery charge and the charge result information, the management server 18 derives an amount of payment to the manager and an amount charged to the user, and performs payment processing for the amount of payment to the manager and billing processing for the amount charged to the user. The amount of payment to the manager is an amount that compensates for the fee for the electricity supplied to the vehicle 20 through the electric outlet 30. The management server 18 transmits, to the user terminal 14, receipt information for the fee for the battery charge and also transmits, to the manager terminal 16, payment completion information for the amount of payment to the manager.

After the completion of the battery charge, the user terminal 14 receives the receipt information from the management server 18. The manager terminal 16 is a terminal used by the manager. The manager terminal 16 may be a mobile terminal, such as a smartphone, cellular phone, tablet terminal, notebook computer, and wearable terminal, or may be a stationary terminal, such as a personal computer. The manager terminal 16 performs wireless communication with the management server 18. After the completion of the battery charge for the user, the manager terminal 16 receives the payment completion information from the management server 18.

Figure 2:
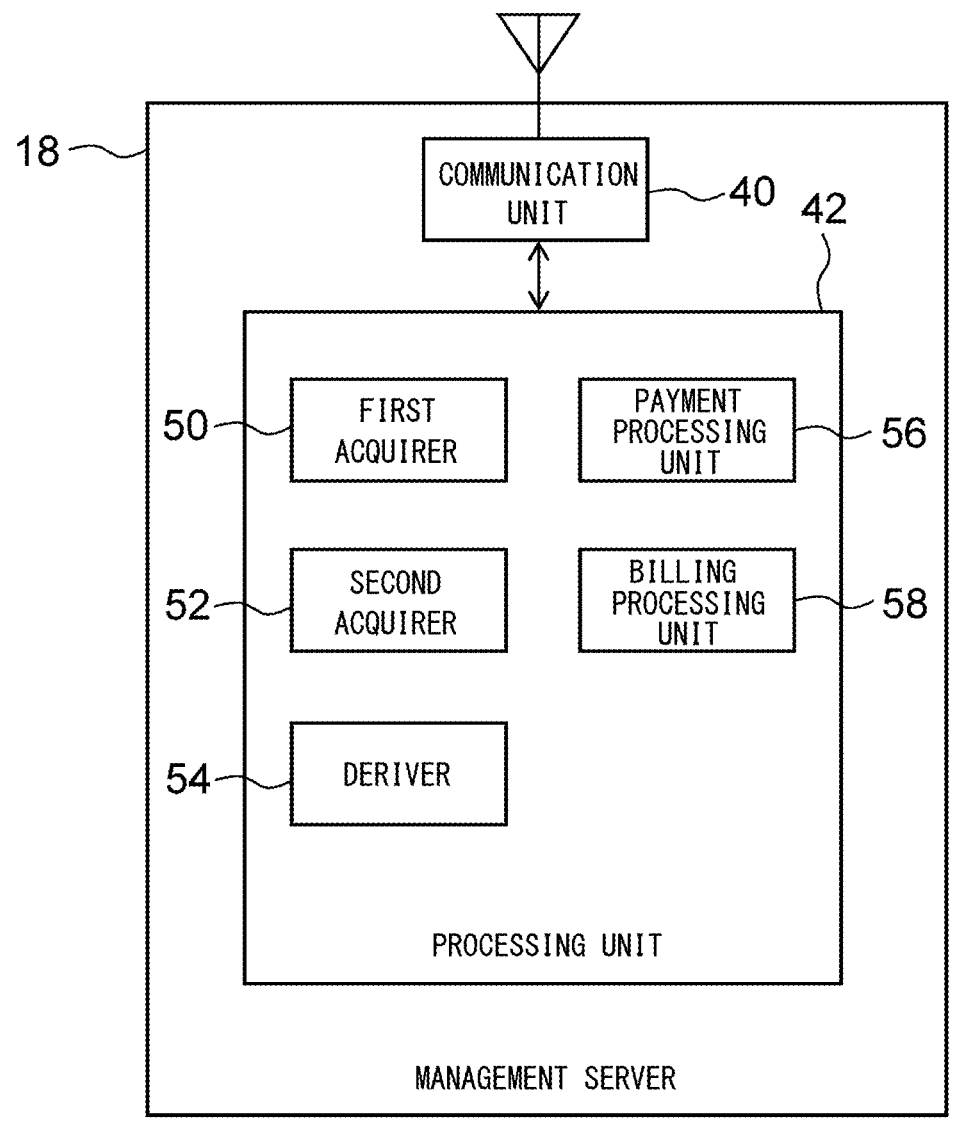
FIG. 2 is a block diagram that shows a configuration of a management server shown in FIG. 1.

FIG. 2 shows a configuration of the management server 18 shown in FIG. 1. The management server 18 includes a communication unit 40 and a processing unit 42. The processing unit 42 includes a first acquirer 50, a second acquirer 52, a deriver 54, a payment processing unit 56, and a billing processing unit 58.

The communication unit 40 performs wireless communication with the user terminal 14. The communication unit 40 also performs wired communication or wireless communication with the manager terminal 16 and the electricity supply device 10. The communication unit 40 receives the use request from the user terminal 14 and outputs the use request thus received to the processing unit 42. According to the information for identifying the user attached to the use request, the processing unit 42 performs user authentication. Upon completion of the user authentication, based on the information for identifying the electric outlet 30 included in the use request, the processing unit 42 transmits, via the communication unit 40, the unlocking request to the electricity supply device 10 that includes the electric outlet 30 specified by the user.

The communication unit 40 receives the contract information from the electricity supply device 10 that includes the electric outlet 30 specified by the user. The first acquirer 50 then acquires the contract information received at the communication unit 40. This corresponds to acquiring, by the first acquirer 50, the contract information from the control device 32 of the electricity supply device 10.

When the contract unit price included in the contract information acquired at the first acquirer 50 is lower than a predetermined unit price, the processing unit 42 transmits, via the communication unit 40, the fee information based on the contract unit price to the user terminal 14 of the user. When the contract unit price is the predetermined unit price or higher, the processing unit 42 transmits, via the communication unit 40, the fee information based on the predetermined unit price to the user terminal 14 of the user. The predetermined unit price may be set in advance by the owner of the management server 18, i.e., the provider of the battery charging service, for example.

The communication unit 40 receives the charge result information from the electricity supply device 10 that includes the electric outlet 30 specified by the user. The second acquirer 52 then acquires the charge result information received at the communication unit 40. This corresponds to acquiring, by the second acquirer 52, the charge result information from the control device 32 of the electricity supply device 10.

Based on the contract information acquired at the first acquirer 50 and the charge result information acquired at the second acquirer 52, the deriver 54 derives the amount of payment to the manager. For example, the deriver 54 may derive the amount of payment to the manager by substituting the contract unit price included in the contract information and the charging time included in the charge result information into a predetermined calculation formula.

When the contract unit price included in the contract information is lower than the predetermined unit price, the deriver 54 derives the amount charged to the user based on the contract unit price and the charge result information. When the contract unit price is the predetermined unit price or higher, the deriver 54 derives the amount charged to the user based on the predetermined unit price and the charge result information.

The payment processing unit 56 performs the payment processing for the derived amount of payment to the manager and transmits the payment completion information to the manager terminal 16 via the communication unit 40. The billing processing unit 58 performs fee charging processing for the derived amount charged to the user and transmits the receipt information to the user terminal 14 via the communication unit 40. The payment processing and the fee charging processing may be performed based on a well-known technology.

The configuration of the processing unit 42 may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 3:
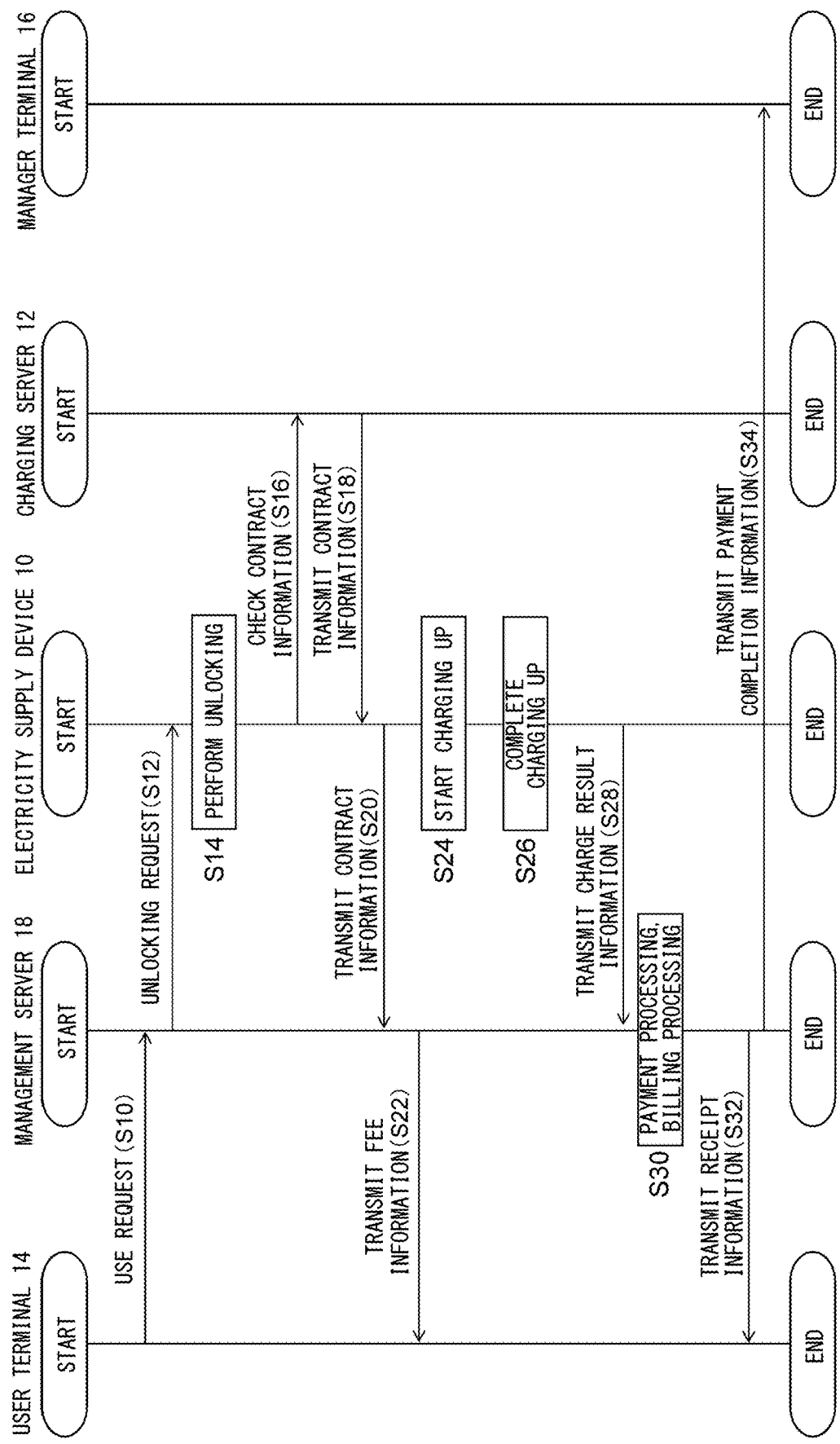
FIG. 3 is a sequential diagram that shows processing performed in the information processing system shown in FIG. 1.

There will now be described the overall operation of the information processing system 1 having the configuration set forth above. FIG. 3 is a sequential diagram that shows processing performed in the information processing system 1 shown in FIG. 1.

First, the user terminal 14 transmits the use request to the management server 18 (S10). According to the use request, the management server 18 transmits the unlocking request to the electricity supply device 10 (S12). According to the unlocking request, the electricity supply device 10 performs unlocking (S14).

The electricity supply device 10 checks with the fee charging server 12 for the contract information (S16). The fee charging server 12 transmits the contract information to the electricity supply device 10 (S18). The electricity supply device 10 transmits the contract information to the management server 18 (S20). The management server 18 transmits the fee information to the user terminal 14 (S22).

When the user agrees to the fee information and connects the vehicle 20 to the electric outlet 30 with a charging cable, the electricity supply device 10 starts battery charge of the vehicle 20 (S24). The electricity supply device 10 completes the battery charge of the vehicle 20 in a predetermined condition (S26). The electricity supply device 10 transmits the charge result information to the management server 18 (S28).

Based on the contract information and the charge result information, the management server 18 derives the amount of payment to the manager and the amount charged to the user, and performs the payment processing and the billing processing (S30). The management server 18 transmits the receipt information to the user terminal 14 (S32) and also transmits the payment completion information to the manager terminal 16 (S34).

According to the present embodiment, since the amount of payment to the manager is derived based on the contract information between the electricity supplier and the manager and on the charge result information of the vehicle 20, the fee for the electricity supplied to the vehicle 20 through the electric outlet 30 can be charged to the manager without increasing the burden on the manager.

More specifically, since the manager is compensated with the amount of payment corresponding to the fee for the electricity supplied to the vehicle 20 through the electric outlet 30, the manager need not bother to bill the user or the owner of the management server 18 for the fee for the electricity supplied to the vehicle 20 through the electric outlet 30.

The manager can supply electricity to the vehicle 20 through the electric outlet 30 based on the contract for which the manager has signed up. Accordingly, when the manager has signed up for an electricity plan with a low unit price, such as a plan that is more economical as the electricity usage becomes greater than a predetermined amount, expecting that the electricity usage at the installation place 100 of the electric outlet 30 would be greater than the predetermined amount, and when the manager gets points corresponding to the electricity usage, since the amount of electricity supplied to the vehicle 20 through the electric outlet 30 is also added to the electricity usage of the manager, the benefit of the manager can be improved.

The electricity supplier may charge the manager the fee for the amount of electricity supplied to the facility of the manager without separating the electricity supplied to the electric outlet 30, and the electricity supplier can derive the electricity fee in the same way as that of a facility where the electricity supply device 10 is not installed. Accordingly, the electricity supplier need not know whether or not the electricity supply device 10 is installed in a facility where electricity is to be supplied, so that the burden on the electricity supplier will not be increased.

When the contract unit price is lower than a predetermined unit price, the amount charged to the user is derived based on the contract unit price and the charge result information. Accordingly, the user can charge up the vehicle battery less expensively using the electric outlet 30 with the lower contract unit price.

When the contract unit price is the predetermined unit price or higher, on the other hand, the amount charged to the user is derived based on the predetermined unit price and the charge result information. Accordingly, even when using the electric outlet 30 with the higher contract unit price, the user can charge up the vehicle battery without bearing the difference between the contract unit price and the predetermined unit price.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

For example, irrespective of the relationship between the contract unit price and the predetermined unit price, the deriver 54 may derive the amount charged to the user based on the contract unit price and the charge result information. This modification restrains financial burden on the owner of the management server 18.

Also, the deriver 54 may derive the amount charged to the user based on the predetermined unit price and the charge result information, irrespective of the contract information. In this modification, the user can charge up the vehicle battery at the same unit price using any electric outlet 30. Accordingly, the situation where a specific electric outlet 30 is intensively used can be reduced.

The charge result information may include the amount of electricity supplied to the vehicle 20 through the electric outlet 30. In this case, the deriver 54 may derive the amount of payment to the manager by substituting the contract unit price included in the contract information and the amount of electricity included in the charge result information into a predetermined calculation formula. This modification allows greater flexibility in the configuration of the information processing system 1.

What is claimed is:

1. A management server comprising at least one processor, the processor is configured to:
   acquire contract information regarding electricity supply between an electricity supplier and a manager of the installation place of an electric outlet supplied with electricity from the electricity supplier;
   acquire charge result information of a user's vehicle charged up with electricity supplied through the electric outlet, the charge result information includes a charging time, and the charging time is measured by a starting charging time which the user's vehicle starts receiving the electricity supply through the electric outlet when the user's vehicle is connected to the electric outlet while the electric outlet is unlocked upon reception of the unlocking request from the management server and an ending charging time which the user's vehicle terminates receiving the electricity supply through the electric outlet; and
   derive an amount of payment to the manager on the basis of the contract information acquired at the first acquirer and the charge result information acquired at the second acquirer.

2. The management server of claim 1, wherein, when a contract unit price included in the contract information is lower than a predetermined unit price, the processor is further configured to derive an amount charged to the user on the basis of the contract unit price and the charge result information.

3. The management server of claim 2, wherein, when the contract unit price is the predetermined unit price or higher, the processor is further configured to derive an amount charged to the user on the basis of the predetermined unit price and the charge result information.

4. An information processing method, comprising:
   acquiring contract information regarding electricity supply between an electricity supplier and a manager of the installation place of an electric outlet supplied with electricity from the electricity supplier;
   acquiring charge result information of a user's vehicle charged up with electricity supplied through the electric outlet, the charge result information includes a charging time, and the charging time is measured by a starting charging time which the user's vehicle starts receiving the electricity supply through the electric outlet when the user's vehicle is connected to the electric outlet while the electric outlet is unlocked upon reception of the unlocking request from the management server and an ending charging time which the user's vehicle terminates receiving the electricity supply through the electric outlet; and deriving an amount of payment to the manager on the basis of the contract information acquired and the charge result information acquired.

5. An information processing system, comprising:

an electricity supply device; and a management server configured to communicate with the electricity supply device, the electricity supply device comprising:

an electric outlet supplied with electricity from an electricity supplier; and a control device configured to retain contract information regarding electricity supply between the electricity supplier and a manager of the installation place of the electric outlet and to record charge result information of a user's vehicle charged up with electricity supplied through the electric outlet, the management server comprising:

a first acquirer configured to acquire the contract information from the control device;

a second acquirer configured to acquire the charge result information from the control device, the charge result information includes a charging time, and the charging time is measured by a starting charging time which the user's vehicle starts receiving the electricity supply through the electric outlet when the user's vehicle is connected to the electric outlet while the electric outlet is unlocked upon reception of the unlocking request from the management server and an ending charging time which the user's vehicle terminates receiving the electricity supply through the electric outlet; and a deriver configured to derive an amount of payment to the manager on the basis of the contract information acquired at the first acquirer and the charge result information acquired at the second acquirer.

* * * * *